D. B. BUTTRILL.
COMBINED SCRAPER AND FENDER.
APPLICATION FILED JUNE 6, 1910.
975,930.
Patented Nov. 15, 1910.
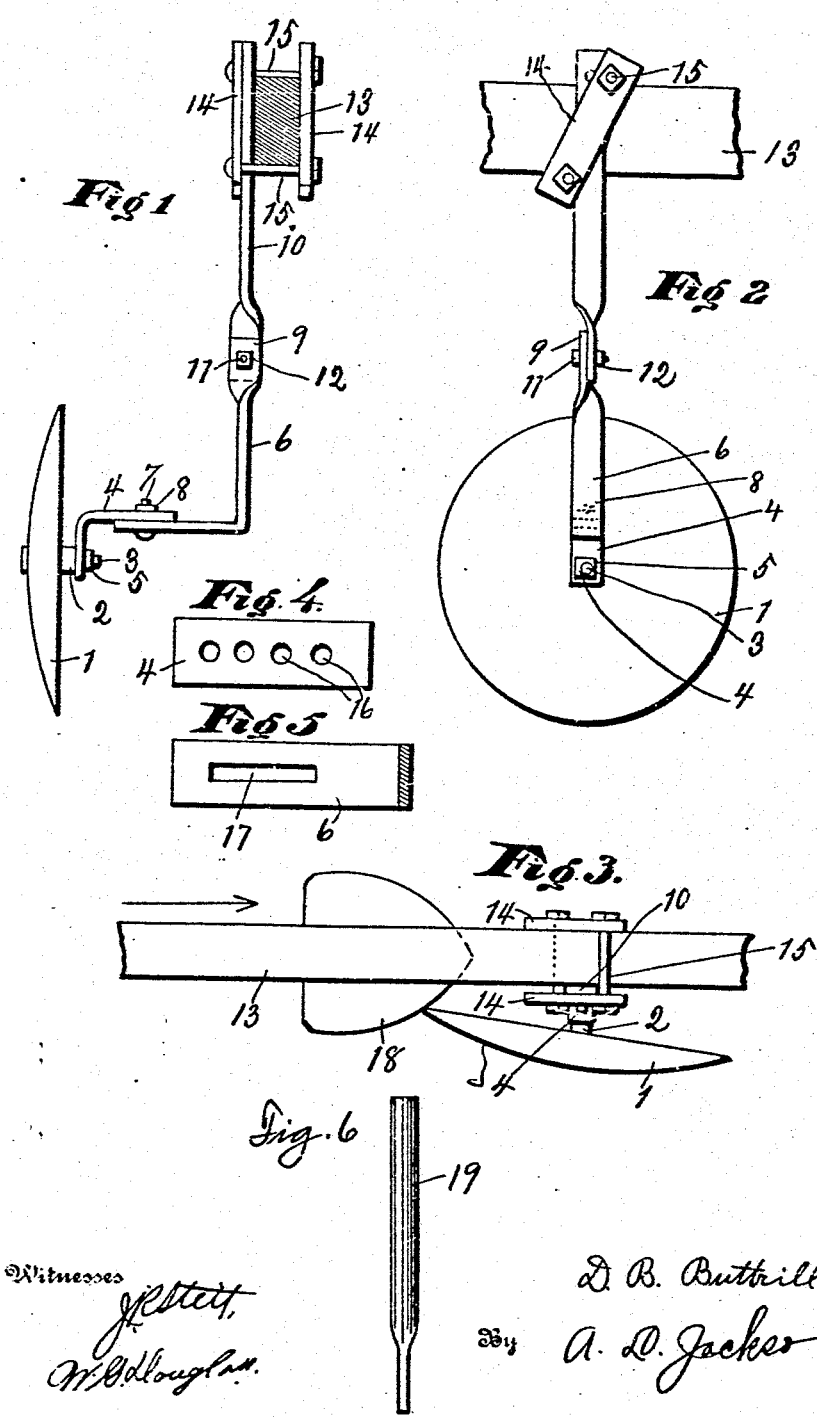

UNITED STATES PATENT OFFICE.

DAVID B. BUTTRILL, OF MANSFIELD, TEXAS.

COMBINED SCRAPER AND FENDER.

975,930.     Specification of Letters Patent.     Patented Nov. 15, 1910.

Application filed June 6, 1910. Serial No. 565,289.

*To all whom it may concern:*

Be it known that I, DAVID B. BUTTRILL, a citizen of the United States, residing at Mansfield, in the county of Tarrant and State of Texas, have invented a new and Improved Combined Scraper and Fender, of which the following is a specification.

This invention relates to plow attachments and more particularly to devices for regulating the plows for different purposes and the object it to provide inexpensive devices for attaching disks to plow stocks and for controlling the disks to run more or less close to the plants, to vary the inclination of the disks from vertical positions and to vary the angle which the disks make with the row of plants.

One object is to make a disk perform two functions,—one to scrape grass away from the plants and to prevent heavy particles or clods of dirt from falling on the plants when the disk is used with a sweep or other plow.

One object of this invention is to provide adjusting devices to regulate the amount of dirt to be thrown to the plants when the disk is used with a sweep or other plow.

Other objects and advantages will be fully explained in the following description and the invention will be more particularly pointed out in the claims.

Reference is had to the accompanying drawings which form a part of this application.

Figure 1 is a front elevation of the disk with the attaching devices. Fig. 2 is a side elevation of the same. Fig. 3 is a plan view of the same, showing the manner of using the disk with a sweep. Fig. 4 and Fig. 5 are detail plan views of portions of the attaching devices, illustrating the manner of adjusting the same. Fig. 6 shows a variation in the piece which is to be attached to a plow beam or cultivator stock.

Similar characters of reference are used to indicate the same parts throughout the several views.

The adjusting devices are adapted to secure an inclination of the disk, that is, to permit a greater or less angle of the disk to a vertical position, and also to adjust the disk to a greater or less angle to the row of plants. The disk 1 is provided with bearing 2 and shaft 3 operating therein. An angle bar 4 is secured on the shaft or spindle 3 by a nut 5. An angle bar 6 is clamped on the angle bar 4 by means of a bolt 7 and nut 8. The angle bar 6 is twisted a quarter turn near the end to prepare the part 9 to be attached to the beam piece 10. The bar 6 is twisted and the bar 10 is similarly twisted to form a joint for the inclination of the disk 1. The bars 6 and 10 are clamped together by a bolt 11 and nut 12. The bar 10 may be attached to a plow beam or stock 13 of any ordinary construction by clamps 14 and bolts 15. To provide for moving the disk farther from or closer to the row of plants, the bar 4 has a series of holes 16 and the bar 6 has a slot 17 therein so that the nut 8 may be released and the bolt 7 placed at different adjustments. The bars 4 and 6 can thus be lapped more or less on each other.

With the adjusting devices shown the bar 4 can be swung on the bolt 7 to change the angle of the disk to the row of plants and the bar 6 can be swung on the bolt 11 to vary the angle of inclination or the inclination of the disk from a vertical position. If the disk is used with a sweep 18 the disk will catch the heavier particles or clods which are being thrown by the sweep toward the plants and prevent the same from falling on the plants. The disk thus acts as a fender. The disk allows the finer particles or soft dirt to pass under the back edge thereof toward the plants and the amount of dirt allowed to be thrown to the plants may be regulated by varying the angle of the sweep to the row of plants and also by moving the position of the clamps 14 on the plow beam. If more dirt is to be thrown to the plants, move the disk farther forward from the sweep. To throw less dirt to the plants, move the disk back or closer to the sweep. The front part of the disk acts as a scraper and the rear part of the disk acts as a fender.

The beam piece, or part to be attached to the plow beam or stock, may be constructed with a cylindrical portion 19, as shown in Fig. 6 so that the adjustments may be attached in the same manner as plows are attached to cultivators.

Having fully described my invention, what I claim as new and desire to secure by Letters Patent, is,—

1. In a plow having a beam, a revolving disk and means for attaching the same to said beam to form a combined scraper and fender, said means consisting of an angle bar attached to said disk and having a horizontal portion, a second angle bar having a horizontal portion and a vertical portion, means for clamping the said horizontal portions at different angles to each other, and at different points of adjustment longitudinally on each other, said last mentioned bar having a portion of said vertical portion twisted a quarter turn, a beam piece having a portion thereof twisted a quarter turn and attached to the twisted portion of said last named bar, and means for attaching said beam piece to said beam at different adjustments.

2. In a plow having a beam, a revolving disk and means for attaching the same to said beam in front of the plow to form a combined scraper and fender, said means consisting of a disk member attached to said disk, a beam member attached to said beam, and an adjusting member attached to said beam member and to said disk member, the joint with said beam member permitting adjustment to vary the inclination of said disk and the joint with said disk member permitting adjustment to vary the angle said disk makes with the row of plants and to vary the distance between the disk and the plants.

3. In a plow having a beam, a revolving disk and means for attaching the same to said beam in front of the plow to form a combined scraper and fender, said means consisting of a disk member attached to said disk and having a horizontal portion with a plurality of holes therethrough, a beam member and means for attaching the same to the beam at different adjustments, an adjusting member having a vertical portion attached to said beam member and a horizontal portion having a slot therein, and a bolt and a nut therefor attaching said adjusting member to said disk member, the joint of said adjusting member to said beam member permitting inclination of said disk and the joint between the adjusting member and the disk member permitting variations of the angle said disk makes with the plants or row of plants and permitting longitudinal adjustments of said members on each other.

In testimony whereof, I set my hand in the presence of two witnesses, this 17th day of May, 1910.

DAVID B. BUTTRILL.

Witnesses:
A. L. JACKSON,
J. W. STITT.